United States Patent
Lei et al.

(10) Patent No.: US 9,824,471 B2
(45) Date of Patent: Nov. 21, 2017

(54) AUTOMATIC GENERATION OF HIERARCHY VISUALIZATIONS

(71) Applicant: Oracle International Corporation, Redwood Shores, CA (US)

(72) Inventors: Louis Y. Lei, San Leandro, CA (US); Frederic Portal, Pleasanton, CA (US); Amira A. Morcos, San Ramon, CA (US); Bhupinder Singh Sondhi, Fremont, CA (US); Tamijselvy Muralidharan, Cupertino, CA (US); Richa Dubey, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 613 days.

(21) Appl. No.: 14/038,640

(22) Filed: Sep. 26, 2013

(65) Prior Publication Data

US 2014/0085307 A1    Mar. 27, 2014

Related U.S. Application Data

(60) Provisional application No. 61/706,408, filed on Sep. 27, 2012, provisional application No. 61/780,685, filed on Mar. 13, 2013.

(51) Int. Cl.
*G06T 11/20* (2006.01)
*G06T 17/00* (2006.01)
*G06F 17/30* (2006.01)

(52) U.S. Cl.
CPC .......... *G06T 11/206* (2013.01); *G06T 17/005* (2013.01); *G06F 17/30592* (2013.01)

(58) Field of Classification Search
CPC ..... Y10S 707/99943; Y10S 707/99942; Y10S 707/99933; Y10S 707/99932;
(Continued)

(56) References Cited

U.S. PATENT DOCUMENTS

| 4,812,628 A | 3/1989 | Boston et al. |
| 5,953,710 A | 9/1999 | Fleming |

(Continued)

OTHER PUBLICATIONS

Non-final Office Action dated Jul. 7, 2015 for U.S. Appl. No. 14/038,737.

(Continued)

*Primary Examiner* — Jeffrey Chow
(74) *Attorney, Agent, or Firm* — Kilpatrick Townsend & Stockton LLP

(57) ABSTRACT

A method, system, and computer program product for presentation of data in enterprise applications. The method form commences by identifying a hierarchy of data maintained by an enterprise application (e.g., in a database). A hierarchy processor or other processor reads the hierarchy of data to configure a graphical representation of the hierarchy of data to be displayed on a display device. The graphical representation includes a graphical display indication corresponding to one or more relationships between items in the displayed hierarchy. Additional display indications include a calculated summary value of aggregated data, such as where the aggregated data is calculated using an aggregation function.

39 Claims, 11 Drawing Sheets

(58) Field of Classification Search
CPC ......... Y10S 707/99934; Y10S 707/954; G06F 17/30592; G06F 17/30554; G06F 3/04842; G06T 11/206; G06T 17/005
See application file for complete search history.

(56) References Cited

U.S. PATENT DOCUMENTS

| | | | |
|---|---|---|---|
| 6,105,011 A | | 8/2000 | Morrison, Jr. |
| 6,754,666 B1* | | 6/2004 | Brookler ............ G06F 17/30595 |
| 7,958,360 B2 | | 6/2011 | Lind et al. |
| 8,249,965 B2 | | 8/2012 | Tumminaro |
| 8,296,228 B1 | | 10/2012 | Kloor |
| 8,412,599 B2 | | 4/2013 | Saiu et al. |
| 2001/0021928 A1 | | 9/2001 | Ludwig et al. |
| 2002/0111886 A1 | | 8/2002 | Chenevich et al. |
| 2002/0133470 A1 | | 9/2002 | Gruber |
| 2002/0156687 A1 | | 10/2002 | Carr et al. |
| 2003/0093373 A1 | | 5/2003 | Smirnoff et al. |
| 2003/0204427 A1 | | 10/2003 | Gune et al. |
| 2005/0086244 A1 | | 4/2005 | Morinville |
| 2005/0222854 A1 | | 10/2005 | Dale et al. |
| 2005/0273431 A1 | | 12/2005 | Abel et al. |
| 2005/0289025 A1 | | 12/2005 | Fredericks et al. |
| 2006/0161485 A1* | | 7/2006 | Meldahl ................ G06Q 40/00 705/35 |
| 2006/0167924 A1* | | 7/2006 | Bradlee ............ G06F 17/30395 |
| 2006/0173698 A1 | | 8/2006 | Morley |
| 2006/0173772 A1 | | 8/2006 | Hayes et al. |
| 2006/0229896 A1 | | 10/2006 | Rosen et al. |
| 2007/0125840 A1 | | 6/2007 | Law et al. |
| 2007/0233615 A1 | | 10/2007 | Tumminaro |
| 2008/0208655 A1 | | 8/2008 | Russo et al. |
| 2008/0235038 A1 | | 9/2008 | Szamel |
| 2009/0006203 A1 | | 1/2009 | Fordyce et al. |
| 2009/0037333 A1 | | 2/2009 | Flitcroft et al. |
| 2009/0063240 A1 | | 3/2009 | Pallari et al. |
| 2009/0099965 A1 | | 4/2009 | Grant, IV |
| 2009/0177563 A1 | | 7/2009 | Bernstein et al. |
| 2009/0198562 A1* | | 8/2009 | Wiesinger ............ G06Q 30/02 705/35 |
| 2009/0248727 A1 | | 10/2009 | Hughes |
| 2010/0017316 A1 | | 1/2010 | Joseph et al. |
| 2010/0179952 A1* | | 7/2010 | Dupont ............ G06F 17/30398 707/740 |
| 2011/0106704 A1 | | 5/2011 | Babi et al. |
| 2011/0125645 A1 | | 5/2011 | Benkert et al. |
| 2011/0153458 A1 | | 6/2011 | Wong et al. |
| 2011/0191217 A1 | | 8/2011 | Saiu et al. |
| 2012/0053989 A1* | | 3/2012 | Richard ............ G06Q 30/0202 705/7.31 |
| 2012/0059745 A1 | | 3/2012 | Fredericks et al. |
| 2012/0290418 A1 | | 11/2012 | Itwaru |
| 2012/0330764 A1 | | 12/2012 | Nahidipour |
| 2012/0330784 A1 | | 12/2012 | Nahidipour |
| 2013/0024258 A1 | | 1/2013 | Nargizian |
| 2013/0080301 A1 | | 3/2013 | Siauw et al. |
| 2013/0138563 A1 | | 5/2013 | Glider et al. |
| 2013/0166422 A1 | | 6/2013 | Soni |
| 2014/0006258 A1 | | 1/2014 | Joseph et al. |
| 2014/0058855 A1 | | 2/2014 | Hussein et al. |
| 2014/0059496 A1 | | 2/2014 | White et al. |
| 2014/0136349 A1 | | 5/2014 | Dave et al. |
| 2014/0222637 A1 | | 8/2014 | Giles |
| 2014/0222669 A1 | | 8/2014 | Novak et al. |

OTHER PUBLICATIONS

Final Office Action dated Jan. 4, 2016 for related U.S. Appl. No. 14/038,737.

* cited by examiner

AUTOMATIC GENERATION OF HIERARCHY VISUALIZATIONS

RELATED APPLICATIONS

The present application claims the benefit of priority to U.S. Provisional Patent Application Ser. No. 61/706,408 entitled "METHOD AND SYSTEM FOR IMPLEMENTING GRAPHICAL HIERARCHY VISUALIZATION", filed Sep. 27, 2012; and the present application claims the benefit of priority to U.S. Provisional Patent Application Ser. No. 61/780,685, entitled "METHOD AND SYSTEM FOR IMPLEMENTING HIERARCHY GRAPHICAL VISUALIZATION", filed Mar. 13, 2013, both of which are hereby incorporated by reference in their entirety.

FIELD

The disclosure relates to the field of presentation of data in enterprise applications and more particularly to techniques for automatic generation of hierarchical data for presentation in hierarchy visualizations.

BACKGROUND

Many businesses and other organizations use software applications and/or suites of such applications to organize their business affairs, track business performance, manage employee data, and perform similar functions. These "enterprise" applications are often quite complex, relying on numerous database tables to store and manage data for virtually every aspect of an organization's business.

The enterprise applications often incorporate, display and/or perform operations on data or information that is hierarchical in nature. For example, enterprise applications often deal with corporations and other entities that correspond to hierarchical organizational structures.

Conventional enterprise applications allow users to create different types of hierarchies, but there is no easy or convenient way to view a graphical representation of the hierarchies. Nor do the conventional tools provide an effective interface to configure the graphical representation of that data. Moreover, the conventional tools fail to provide an effective interface to configure data-specific analysis, aggregation and presentation of such hierarchical data.

The present disclosure describes various embodiments that use a flexible framework to allow a user to configure the data displayed in the visualization, which permits users to visualize the relationships and data aggregation (e.g., sum of children data, counts of child data, etc.) of the hierarchical data. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for automatic generation of hierarchical data for presentation in hierarchy visualizations.

The method form commences by identifying a hierarchy of data maintained by an enterprise application (e.g., in a database). A hierarchy processor or other processor reads the hierarchy of data to configure a graphical representation of the hierarchy of data to be displayed on a display device. The graphical representation includes a graphical display indication corresponding to a relationship between items in the displayed hierarchy. Additional display indications include a calculated summary value of aggregated data, such as where the aggregated data is calculated using an aggregation function.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
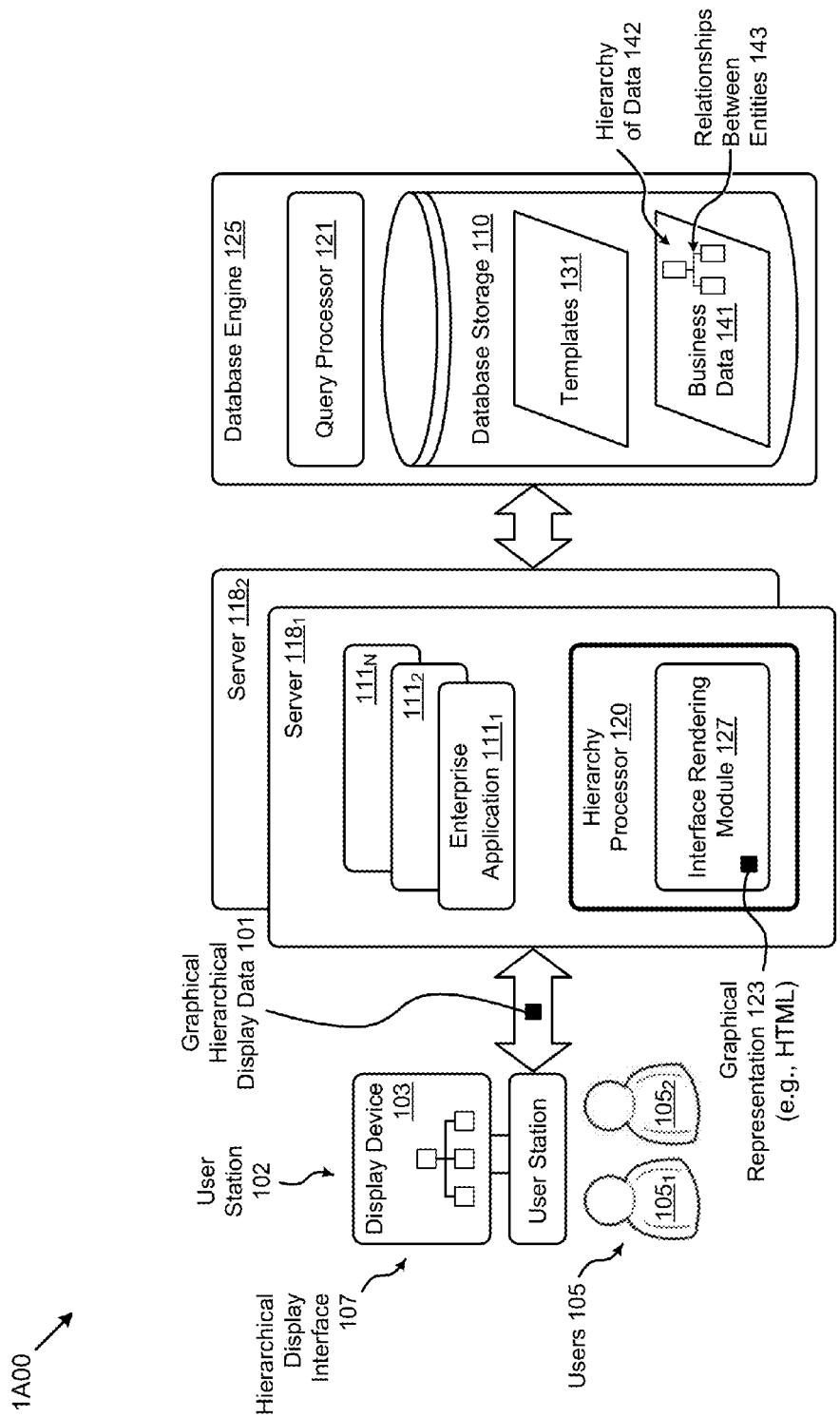
FIG. 1A exemplifies an environment for automatic generation of hierarchical data for presentation in hierarchy visualizations, according to some embodiments.

Disclosed herein and in the accompanying figures are exemplary environments, methods, and systems for automatic generation of hierarchical data for presentation in hierarchy visualizations.

Overview

The structure of data of any sort, including business data, often observes a hierarchical organization. For example, a company may have subsidiaries, a subsidiary may have operating units, an operating unit may have an executive team, etc. In some cases, a particular hierarchical structure is used to initially define the data (e.g., into a relation within a relational database system). In some cases, a hierarchical relationship can be imputed from relationship(s) in the data itself.

Legacy systems for presenting hierarchical data have relied on hierarchical input in accordance with hierarchical input rules (e.g., for building "org charts"), and data collected in accordance with the given hierarchical input can be presented in a hierarchy chart. However, as is disclosed herein, hierarchical relationships can be found in the data even in absence of explicit observance of hierarchical input rules. Moreover, legacy systems have not kept pace with the need for presenting and analyzing data in a hierarchical fashion. For example, while business managers might avail themselves of a hierarchical presentation of the relationships between a particular subsidiary and its constituent operating units, a business manage might want to see (for example) a revenue contribution for each of the operating units, and have the sum of the contributions aggregated for display on a hierarchical chart that shows (1) the entities (e.g., subsidiary, operating units, etc.), (2) the relationship or relationships between the entities, and (3) the individual contributions of the entities in the operating units.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies an environment 1A00 for automatic generation of hierarchical data for presentation in hierarchy visualizations.

As shown, the environment 1A00 includes one or more users 105 (e.g., user $105_1$, user $105_2$) situated at one or more user stations (e.g., user station 102). The user station 102 comprises any type of computing station that may be used to operate in conjunction with and/or interface with any one or more enterprise applications (e.g., enterprise application $111_1$, enterprise application $111_2$, enterprise application $111_N$, etc.), which enterprise applications are hosted on one or more servers (e.g., server $118_1$, server $118_2$ etc.).

Strictly as examples, enterprise applications can include supply chain management ("SCM") applications that manage raw materials, work-in-process and/or finished products, and coordinate with suppliers; customer relations management ("CRM") applications that are used to track, store and/or manage customer information; financial applications that track and/or analyze the financial performance of the organization; human resources applications that provide management of the human resources functions of the organization, and other applications. In some cases, these applications are standalone applications; in other cases, a single business application or suite of applications might provide some or all such functionality.

Examples of user stations include workstations, personal computers, or remote computing terminals. Exemplary user stations comprise a display device 103, such as a display monitor, for displaying a user interface to users at the user station. A user station 102 may comprises one or more input devices for the user to provide operational control over the activities of the system such as a touch screen, and/or a mouse, and/or a keyboard to manipulate and/or point to an object displayed in a graphical user interface in order to generate user inputs to the enterprise application(s) at server 118.

In addition to the shown enterprise applications, a server hosts a hierarchy processor 120, which in turn hosts an interface rendering module 127. In some embodiments, an interface rendering module 127 is used to generate graphical hierarchy display data into computer readable code to form a graphical representation 123 (e.g., in HTML, HTML5, gifs, jpegs, etc.) that can be communicated over a communication path as graphical hierarchical display data 101 (e.g., HTML, HTML5, gifs, jpegs, etc.) to be displayed at a display device 103 at the user station 102. The hierarchical display interface 107 advantageously allows a user to visualize and interact with any of one or more relationships between the displayed entities (e.g., using a graphical display indication such as a line or arrow). The hierarchical display interface 107 shows various data corresponding to a particular entity (e.g., customer, business unit, etc.). Furthermore, aggregated data retrieved from the entity's children/descendants is presented, and screen devices are provided to allow a user to drill down to display more detail and/or to take next actions to change or otherwise interact with the hierarchical display interface 107.

As shown, constituent processes hosted on a server can communicate with a database engine 125. Such a database engine can process queries (e.g., using a query processor 121) and can retrieve data from database storage 110. Database storage can store business data 141 and templates 131. The database storage 110 is a computer readable storage device. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage. Further characteristics of databases implemented using computer readable storage are described in FIG. 10.

As shown, a computer readable storage (e.g., database storage 110) holds one or more templates 131 that be set up to control the parameters of how the interface rendering module 127 operates to generate the hierarchical display interface 107. Furthermore, one or more templates can be set up to control the parameters of how the data pertaining to an entity (e.g., customer, supplier) is collected (e.g., see FIG. 4), how hierarchical data is aggregated and presented in fields (e.g., see FIG. 5), and how nodes of a hierarchy are to be displayed in a consistent manner (e.g., see FIG. 6).

The templates may be populated using any forms of business data. While the illustrative embodiments specifically refer to a "customer hierarchy", and/or to "customer data", it is noted that the disclosed techniques are applicable to any forms of a hierarchy of data 142 (e.g., a hierarchy of entities) as may be stored and as may be used in an enterprise application. For example, the disclosed techniques may be applied to graphically display "supplier" data for a supply chain application. Further, the hierarchies discussed in the disclosed techniques can be any hierarchy present in the data, and such hierarchies are not limited to hierarchies as may be described in any particular instance of a schema or data definition. Entities within a hierarchy are related by one or more relationships (e.g., relationships between entities 143, as shown).

Figure 1B:
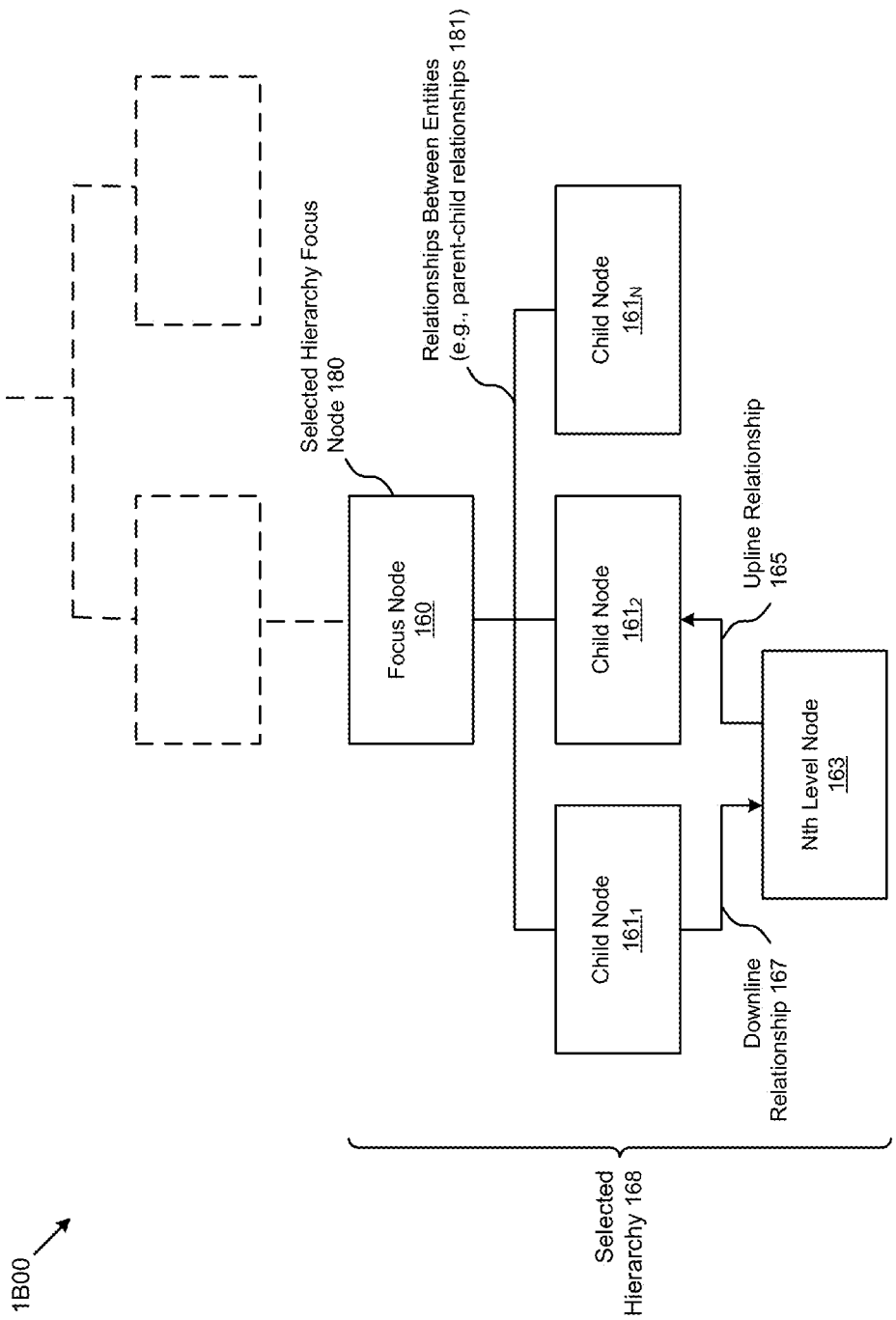
FIG. 1B depicts an entity hierarchy having relationships between entities as used in systems providing automatic generation of hierarchical data for presentation in hierarchy visualizations, according to some embodiments.

FIG. 1B depicts an entity hierarchy 1B00 having relationships between entities as used in systems providing automatic generation of hierarchical data for presentation in hierarchy visualizations. As an option, one or more instances of entity hierarchy 1B00 or any aspect thereof may be implemented in the context of the architecture and functionality of the embodiments described herein. Also, the entity hierarchy 1B00 or any aspect thereof may be implemented in any desired environment.

The shown hierarchy visualization comprises graphical depictions of entities juxtaposed into a hierarchy. This example includes a focus node 160. The shown focus node 160 has children and other descendants shown as child node $161_1$, child node $161_2$, child node $161_N$, and Nth level node 163. Further, the hierarchy visualization depicts relationships between entities (e.g., parent-child relationships 181 between entities), and may include a downline relationship 167, and/or an upline relationship 165. Such relationships are shown as line segments, however other techniques to depict a hierarchical relationship are possible (e.g., juxtaposition, shadowing, etc.).

Some of the descriptions herein refer to aspects of hierarchy visualizations using the following terms:

Node: A representation of an entity formed by an individual instance of data. As shown in FIG. 1B, a node is represented as a box with one or more lines connecting it to its parent node or nodes and to its sibling and/or child nodes, if any.

Focus node: A selected top-level node. A selected top-level node defines the top level of a selected hierarchy 168. A focus node can be deemed to be a selected top-level node. A selected hierarchy focus node 180 can have a parent in a yet higher level of the hierarchy.

Parent node: Denotes node position. A node that has one or more child nodes. Any node can be a parent for other nodes.

Child node: Denotes a node position lower than a parent node. A child node is one level below its parent node. A child node can have more than one parent node.

Sibling node: Denotes node position. Sibling nodes are relative to each other in that they share the same level.

Connector lines: Line segments that link node depictions in an interactive chart. Connectors denote parent and child relationships, and such relationship can be described as pertaining to a child-to-parent relationship (e.g., an upline relationship) and/or as a parent-to-child relationship (e.g., a downline relationship).

Level: An interactive chart is made up of boxes, representing nodes, at different levels. The position of a node in a chart is determined in part by its hierarchical relationship to other entities (parent, sibling, or child).

In an interactive implementation of the shown hierarchy, a user can select to view different types of data and/or select items (e.g., "clickable items") to see more details. For example, a hierarchical display interface 107 can include interactive controls for user interaction. Strictly as examples:

A hierarchy checkbox controls whether to show the full hierarchy, or just the selected node and its immediate parents and immediate children.

A view dropdown, allows user to select different groups or categories of data (e.g., selecting a "Customer Balance" dropdown menu item serves to display the customer balance data, or selecting "Customer Metrics" serves to display metrics, such YTD Sales, High Balance, Average Days late, for the customer).

A zoom control is used to select more (or fewer) fields in a view. For example, for Customer Balance view, there might be many fields. Zooming in shows more fields, perhaps in trade-off for showing fewer relationships. Zooming out shows fewer fields. When the zoom function operates such that the displayed node sizes are reduced, then more of the relationship can be made visible to the user. Zoom views can be set up as a child view (see FIG. 6).

Such controls can be established and pre-configured in a template 131

A user can also select to view more data or more of the relationships (e.g., using a zoom operation). The display may present any number of levels for the hierarchy. Therefore, while entity hierarchy 1B00 illustratively presents only a two-level hierarchy, it is noted that the techniques described herein are applicable to any number of depth levels of hierarchy and/or to any extent or width of any number of nodes.

A node can be presented in a hierarchical display interface (e.g., an interface screen), and can be decorated with various node-specific information. An exemplary interface screen is presently discussed.

Figure 2:
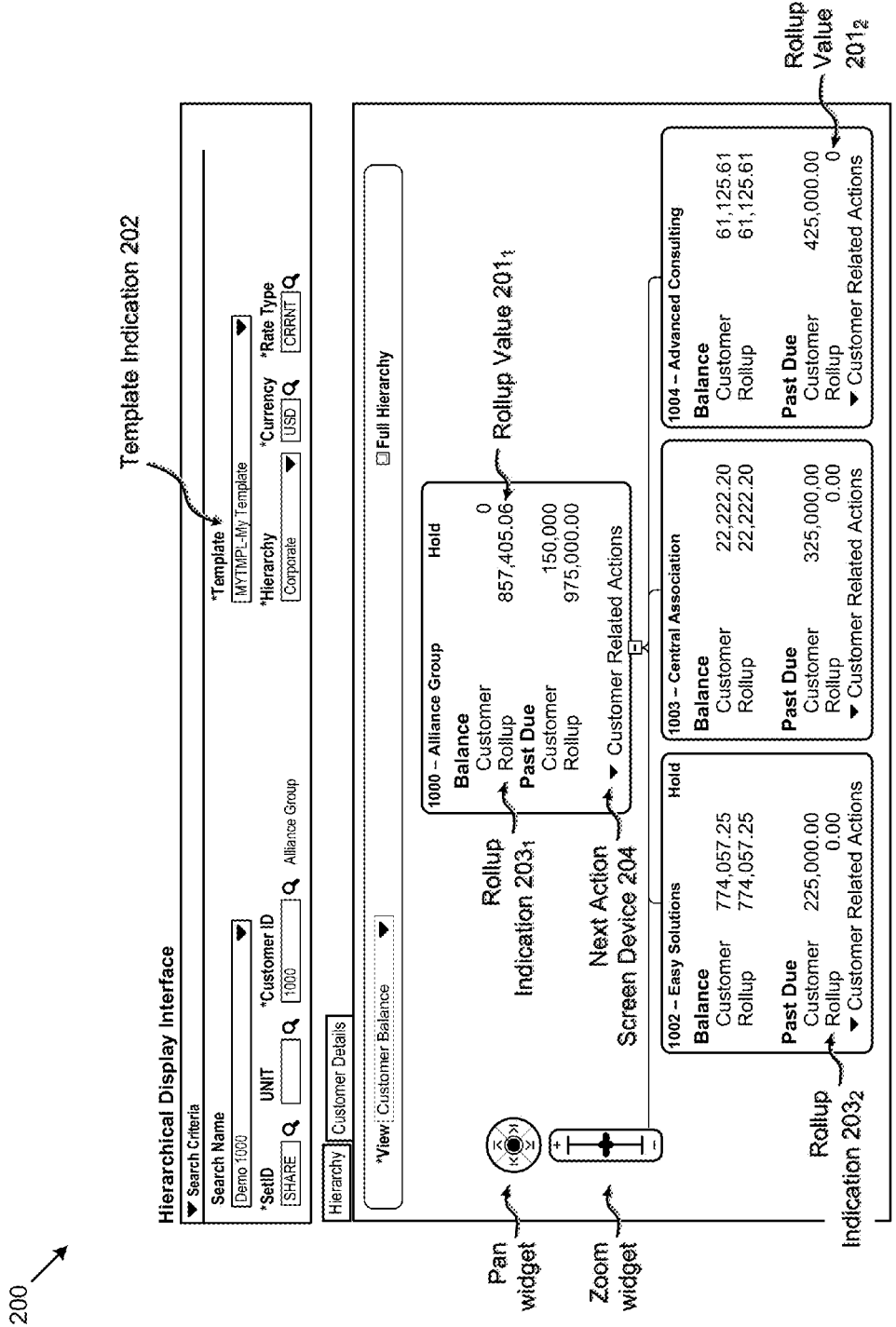
FIG. 2 depicts an example interface screen for graphically displaying business data in a hierarchy as used within systems providing automatic generation of hierarchical data for presentation in hierarchy visualizations, according to some embodiments.

FIG. 2 depicts an example interface screen 200 for graphically displaying business data in a hierarchy as used within systems providing automatic generation of hierarchical data for presentation in hierarchy visualizations. As an option, one or more instances of example interface screen 200 or any aspect thereof may be implemented in the context of the architecture and functionality of the embodiments described herein. Also, the example interface screen 200 or any aspect thereof may be implemented in any desired environment.

As shown, the depiction of interface screen 200 includes a hierarchical display interface 107. The particular look-and-feel of the display can be at least partially defined by a template 131, and such a template can be named using template indication 202. Templates can be used to describe characteristics of a hierarchical display interface including specification of how hierarchical data is collected (e.g., see FIG. 4), how hierarchical data is aggregated and presented in fields (e.g., see FIG. 5), and how nodes of a hierarchy are to be displayed in a consistent manner (e.g., see FIG. 6).

In this specific example, the template indication identifies an object named "MYTMPL-My Template". Such an object may further reference other objects that are used when presenting a hierarchical display interface 107. And, such further referenced objects may specify data to be aggregated into one or more roll-up indications 203 (e.g., using a roll-up indication $203_1$, roll-up indication $203_2$, etc.). Such a roll-up indication can be the name of a data item in a database or can be a user-specified label. As shown, the roll-up indication is associated with a roll-up value (e.g., roll-up value $201_1$, roll-up value $201_2$, etc.).

Any node (e.g., the focus node, as shown) can comprise a next action screen device 204. In this example, the next action screen device is a triangular screen device that indicates availability of next actions. Such next actions can include next actions that are relevant to the underlying application. For example, in an accounting application, such next actions may comprise:

Open new AP application window
Approve vouchers
Mark as "Payment on Hold"
Retrieve supplier contract
Cancel payment
etc.

Such next actions can be indicated using a pop-up screen device or any other screen device as may be implemented by the underlying application.

Controls can be established and control screen devices can be displayed to aid the user in navigating between nodes. For example, any node shown in the display (e.g., a child node of the then current focus node) can be selected to become the new focus node, and the display will be recalculated and refreshed.

An application may form a hierarchical display interface using application-native routines (e.g., lists and/or lists of lists), or an application may form a hierarchical display interface using a hierarchy processor 120. In either case (or other cases as may be selected by an implementer), an application may form a hierarchical display interface using an approach that includes retrieving and processing hierarchical data. Such an approach is presently discussed.

Figure 3:
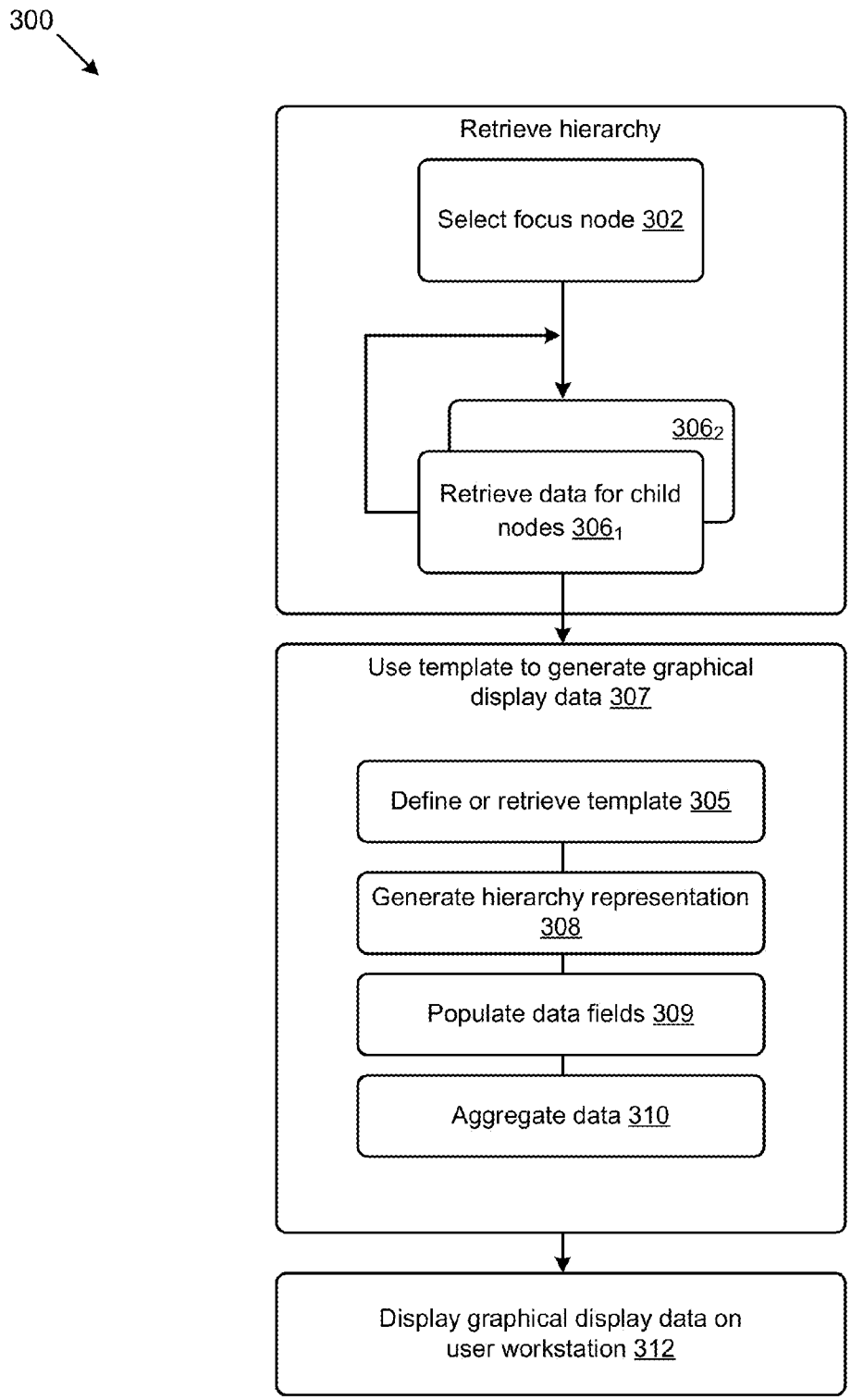
FIG. 3 is a flowchart of an approach for retrieving and processing hierarchical data as used in systems providing automatic generation of hierarchical data for presentation in hierarchy visualizations, according to some embodiments.

FIG. 3 is a flowchart of an approach 300 for retrieving and processing hierarchical data as used in systems providing automatic generation of hierarchical data for presentation in hierarchy visualizations. As an option, one or more instances of approach 300 or any aspect thereof may be implemented in the context of the architecture and functionality of the embodiments described herein. Also, the approach 300 or any aspect thereof may be implemented in any desired environment.

As shown, the flowchart commences to retrieve a hierarchy by selecting a focus node (see operation 302). The selection can come from a user selection, or can come from a computer-implemented selection of a focus node. As earlier indicated, a focus node can correspond to a particular business entity (e.g., customer, supplier). A query can be formed using the business data to retrieve relationship information (e.g., parents, children, siblings, etc.) to determine a hierarchical organization (see operation $306_1$ and operation $306_2$). This might be performed recursively to retrieve the full hierarchical structure. Strictly as an example, Table 1 gives a relation having an implied hierarchy:

TABLE 1

| Business data relation | | |
|---|---|---|
| Index Column | Child Data Column | Data Value Column |
| A | B | $1 |
| B | C | $2 |
| B | D | $3 |
| B | E | $4 |

TABLE 1-continued

| Business data relation | | |
|---|---|---|
| Index Column | Child Data Column | Data Value Column |
| C | — | $5 |
| D | — | $6 |
| E | F | $7 |
| F | — | $8 |

In the example of Table 1, "A" has a child "B". And "B" has children "C", "D", and "E". And, "E" has a child "F". The node "F" is a grandchild of "A". Table 1 also gives a data value column. In this case the data is given in dollars (e.g., $1, $2, $3, etc.). Such data can be aggregated or rolled-up through a hierarchy such that a given node in the hierarchy can display a rollup value. In the example of Table 1, node "F" (a lowest level node) has a node value of $8. Since "F" has no children, there is no contribution from lower level entities, so the rollup value of "F" is $0 and $0 is contributed to the rollup value of parent "E". Parent "E" in turn has a node value of $7, and a contribution from its children (in this case, node "F") of $8, so has an aggregated value of $15.

In some cases data is stored such that child points to parent. In such a case the hierarchy can be retrieved beginning with a focus node, and referring to it as a child node. Table 2 depicts storage of hierarchical relationships.

TABLE 2

| Child-oriented business data relation | | |
|---|---|---|
| Index Column | Parent Column | Data Value Column |
| A | — | $1 |
| B | A | $2 |
| C | B | $3 |
| D | B | $4 |

The hierarchy in Table 2 described a hierarchy where A is the focus node of the hierarchy. Relationship and rollup values are as follows:

A is the parent of B (see row 2 of Table 2) and its rollup value (including itself) is $10.
B is parent of C and D (see rows 3 and 4 of Table 2), and its rollup value is $9.
C is leaf, and its rollup value is $3.
D is leaf, and its rollup value is $4.

After retrieving the hierarchy, the retrieved data is used with a template to generate graphical display data (see subsystem 307). A template is retrieved (see operation 305), and the flow then proceeds to use the retrieved template(s) to generate graphical display data. The operations to generate graphical display data can be partitioned such that objects constituent to a hierarchical display interface are organized into a hierarchical representation (see operation 308) and then such objects are populated with values corresponding to data fields (see operation 309). Having the objects hierarchically organized and populated with data values, the data can then be aggregated (see operation 310) so as to codify rollup indications and rollup values in a machine-readable representation. In the specific partitioning shown in FIG. 1, an interface rendering module 127 is used to generate the graphical hierarchy display data into a graphical representation 123 that can be communicated over a communication path, as graphical hierarchical display data 101, to be displayed at a display device at the user station (see operation 312).

Figure 4:
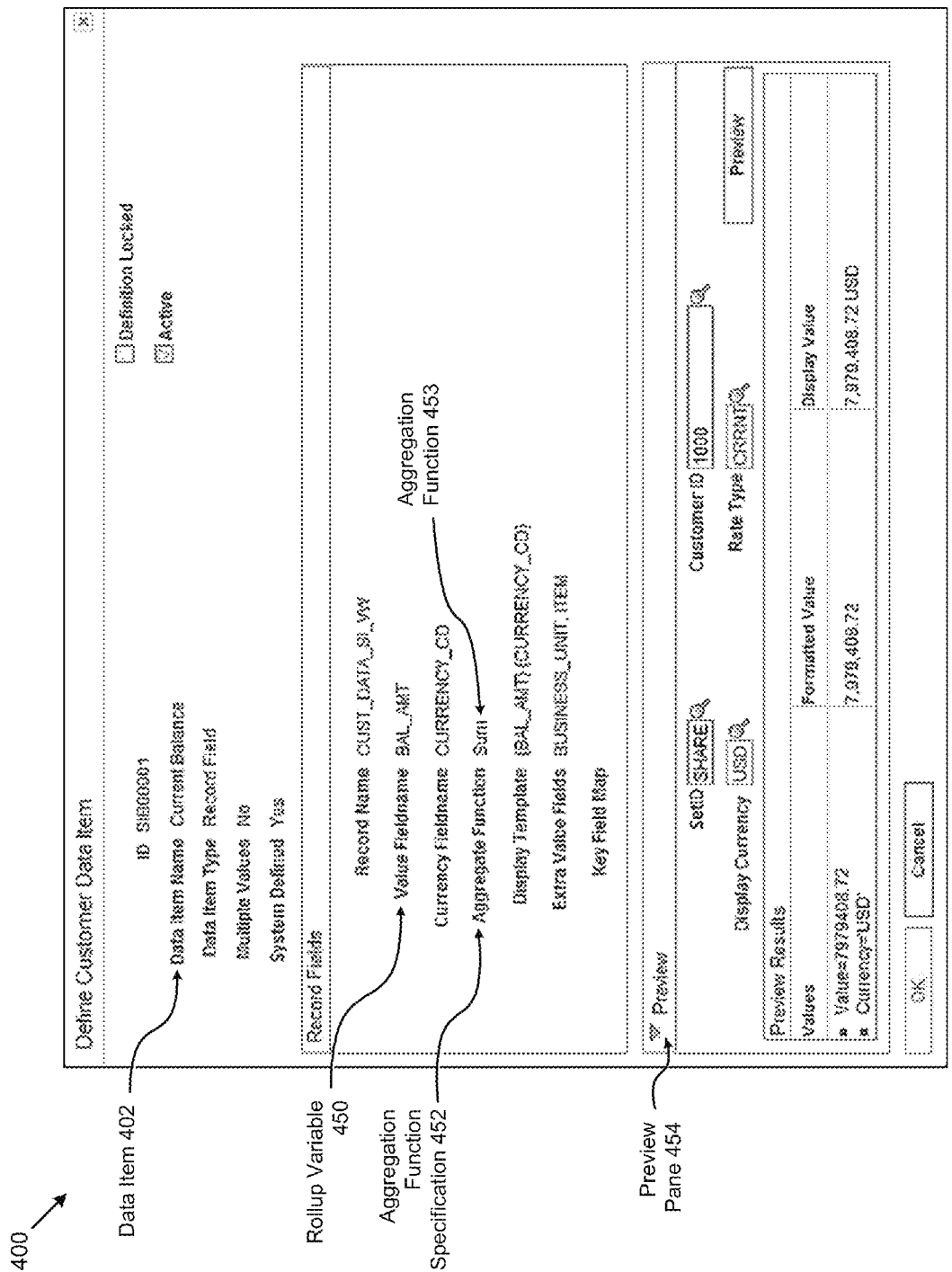
FIG. 4 is a data item definition screen to specify analysis and display characteristics as used in systems providing automatic generation of hierarchical data for presentation in hierarchy visualizations, according to some embodiments.

In some embodiments, a framework is provided to be used by the enterprise applications 111 to store parameters and configuration controls for display and interaction. This allows users to configure the data displayed in the hierarchy with flexible levels of customization. Strictly as one example, a framework may facilitate business data items (e.g., attributes of entity, such as customer's balance) to be defined (FIG. 4). A business data item and its value or values can be further used as a source to a data field, which adds options as to whether to aggregate data in the hierarchy, and what function or functions to use in the aggregation (see aggregation function specification of FIG. 5).

A framework may further be configured to facilitate definition of one or more data fields, which data fields are added, for example, to a template that describes the layout, labeling, and formatting of the data. Labeling and formatting can be specific to a particular data item in a one-to-one correspondence.

The following provides a further description of the foregoing, and interrelationships between components. The selection of components, and their descriptions and interrelationships is purely illustrative, and is not limiting of the claims.

A data item is an attribute or a piece of data of an entity. For example, a data item can be customer balance, or customer name. In exemplary cases, a data item can be subject to aggregation (a summation form of aggregation where the sum of all open invoices for a customer is the balance of the customer). A data item is set up by an entity such that there can be multiple data items for a single entity A data field is a field to be displayed in the hierarchy. Its source is a data item. It can be aggregated across levels within the hierarchy. For example, a rollup of a customer balance for "Customer A" could include the balance of "Customer A" plus the sum of the customer balances of "Customer A's" descendants.

A template describes how the data fields are grouped and displayed in the node. The groupings can be at different levels. A template comprises views.

A view provides a way to view different data sets or categories of data. For example, a view can be selected to display customer balance information, and a different view can be selected to display customer metrics. A view can comprise user controls. For example, a user control can include a screen device for controlling zoom levels.

A particular zoom level presents a particular set of node fields. A selected zoom level allows a user to choose whether to see more (or fewer) data fields. Zoom controls can be combined with scrolling controls such that a user can scroll or pan through the display to see more information.

A node fields can point to a data field.

A data field can point to a data item as data source.

A template can comprise information configurable by users. A template can correspond to an individual user or can correspond to a user role. Different roles may have different levels of access to the template. By including or excluding data fields in the template accessible by user, it permits template to be used as a security measure to control the level of access given to individuals and groups in a company.

Data items in the template can be grouped into views to provide different analysis and visibility focus. As an example, a "Customer Balance" view can be used to display data fields that are useful in analyzing the customer's balance information. A "Customer Metrics" view can be used to focus on customer performance. Within each view, a zoom level can also be created to determine whether to display more or less data.

FIG. 4 is a data item definition screen 400 to specify analysis and display characteristics as used in systems providing automatic generation of hierarchical data for presentation in hierarchy visualizations. As an option, one or more instances of data item definition screen 400 or any aspect thereof may be implemented in the context of the architecture and functionality of the embodiments described herein. Also, the data item definition screen 400 or any aspect thereof may be implemented in any desired environment.

As shown, a data item 402 is identified by a name (e.g., "current balance"). Such a data item is retrievable from a storage facility (e.g., from a database using a query). The data item may refer to a data record that comprises multiple record fields, and the multiple record fields may each have a field name and a field value. For example, and as shown, a record format of data item 402 comprises a plurality of record fields (e.g., "Record Name", "Value Fieldname", "Currency Fieldname", etc.). Among the record fields can be a variable to aggregate (e.g., a rollup variable 450), and the record fields can also comprise details used in an aggregation operation (e.g., aggregation function specification 452, aggregation function 453). An aggregation function 453 can be any function that can operate on two or more data values. As non-limiting examples, an aggregation function can be {"SUM", "COUNT", "MAX", "MIN"}, etc.

Some embodiments of a data item definition screen 400 comprise a preview pane 454, which preview pane facilitates user verification of the look-and-feel (e.g., label, layout, formatting, etc.) of a subject data item.

Figure 5:
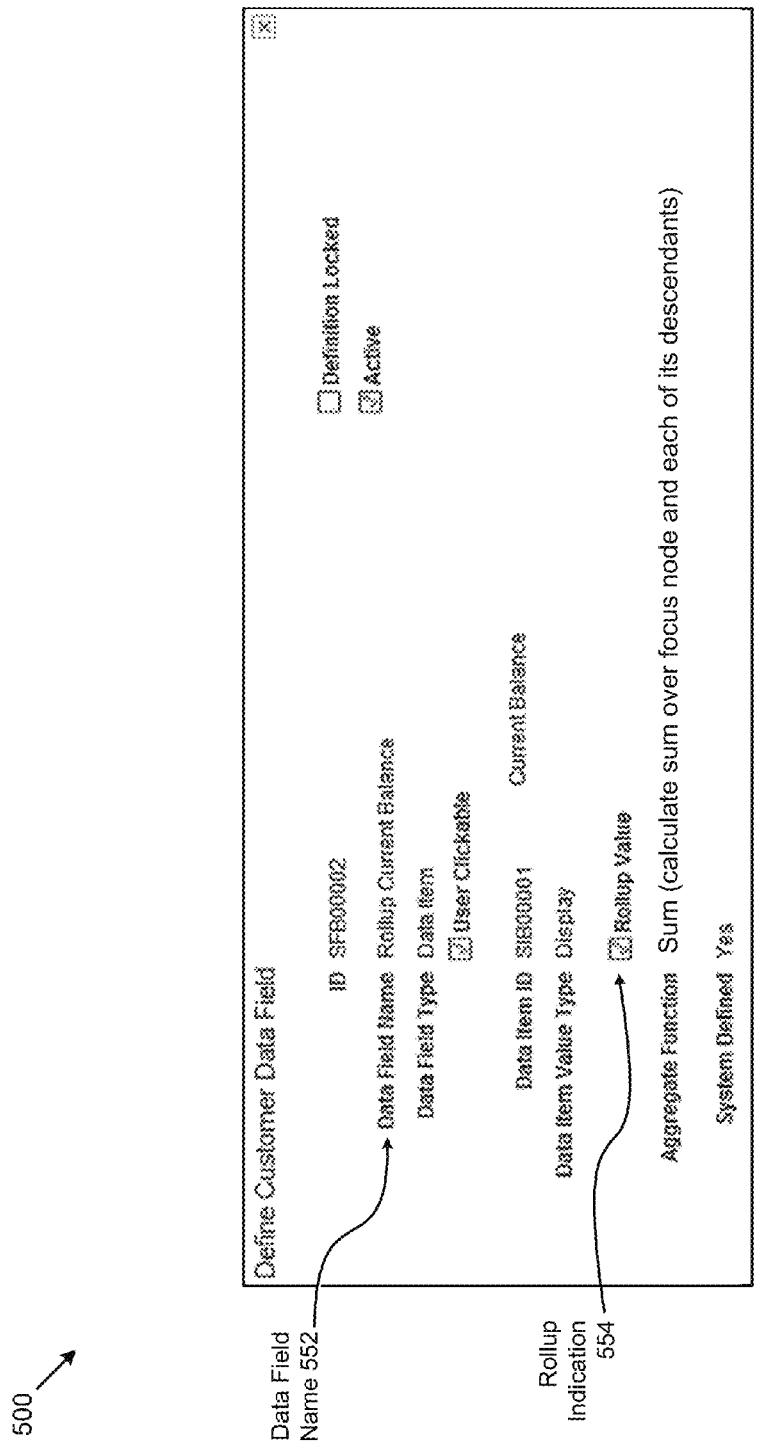
FIG. 5 is a data field definition screen to specify characteristics of data fields as used in systems providing automatic generation of hierarchical data for presentation in hierarchy visualizations, according to some embodiments.

FIG. 5 is a data field definition screen 500 to specify characteristics of data fields as used in systems providing automatic generation of hierarchical data for presentation in hierarchy visualizations. As an option, one or more instances of data field definition screen 500 or any aspect thereof may be implemented in the context of the architecture and functionality of the embodiments described herein. Also, the data field definition screen 500 or any aspect thereof may be implemented in any desired environment.

As shown, a particular data item (see FIG. 4) is used as data source to a data field. A data field definition screen 500 facilitate the specification of various characteristics and/or options as to whether or not to permit user clicking or otherwise diving into the hierarchy. Such a data field definition screen 500 also facilitates specification of action handling to be invoked, for example, when a user clicks on the subject data field in the hierarchical display interface.

A user can specify attributes of a data item, and such a data item can be referred to using a data field name 552. Additional attributes can be specified, for example using a rollup indication 554.

The ID of the subject data field (e.g., "SFB00002") is then associated with a data item (e.g., "SIB00001"), which is then associated with a template, which further serves to describe the layout and presentation of the specified data fields of the subject data item. Such a template that serves to describe the layout and presentation of a hierarchical display interface is shown in FIG. 6.

Figure 6:
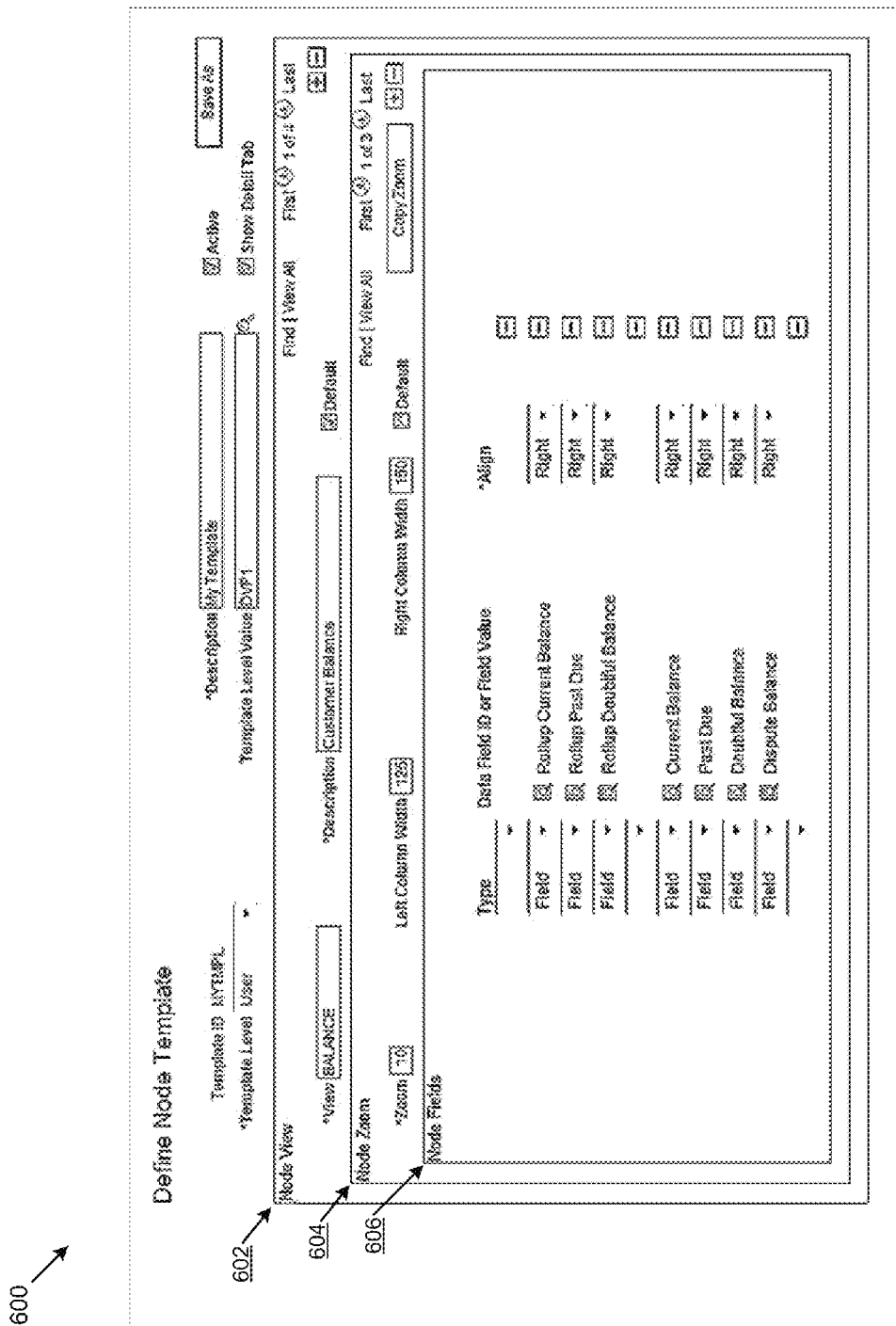
FIG. 6 is a node template definition screen to specify characteristics of a node as used in systems providing automatic generation of hierarchical data for presentation in hierarchy visualizations, according to some embodiments.

FIG. 6 is a node template definition screen 600 to specify characteristics of a node as used in systems providing automatic generation of hierarchical data for presentation in hierarchy visualizations. As an option, one or more instances of node template definition screen 600 or any aspect thereof may be implemented in the context of the architecture and functionality of the embodiments described herein. Also, the node template definition screen 600 or any aspect thereof may be implemented in any desired environment.

The shown node template definition screen includes a node view panel 602, a node zoom panel 604, and an array of node fields 606. Operation of node template definition screen is facilitated by UI controls (e.g., "First", "Last" and "+"/"−" page controls).

The shown node template definition screen includes a template ID (e.g., "MYTMPL"), and a handle, (e.g., Description "My Template"). The node view panel 602 includes a view indication (e.g., "Balance").

In the node fields panel, any number of data fields can be displayed, and various formatting options can be set by the user. For example, the field "Current Balance" is associated with a "Right" alignment. In addition to fields, the node fields panel may present formatting options for headers, labels, and actions. As an example, when a field is specified (e.g., by a configuring user) to correspond to an "Action", the configuring user can provide a label to display in a displayed node, in which case, when a user 105 clicks on the label, a popup is displayed to allow user 105 to select any of the actions associated with the node.

Figure 7:
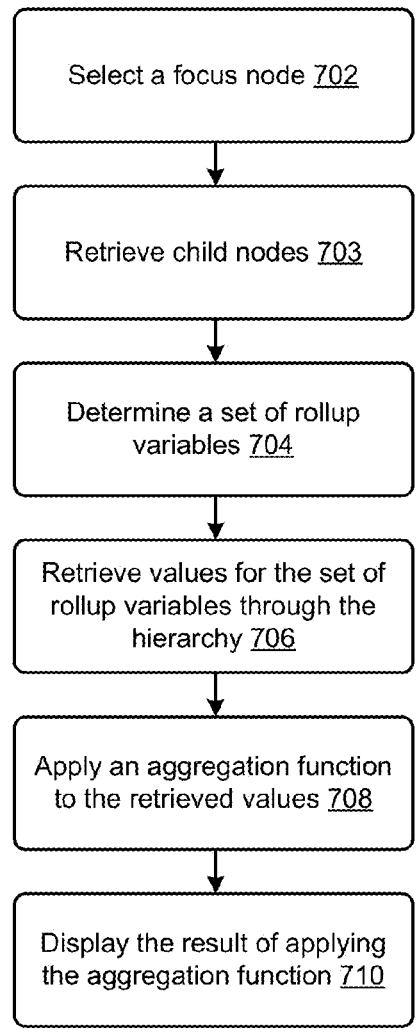
FIG. 7 is a flowchart of a data aggregation approach for displaying aggregated data in a hierarchy as used in systems providing automatic generation of hierarchical data for presentation in hierarchy visualizations, according to some embodiments.

FIG. 7 is a flowchart of a data aggregation approach 700 for displaying aggregated data in a hierarchy as used in systems providing automatic generation of hierarchical data for presentation in hierarchy visualizations. As an option, one or more instances of data aggregation approach 700 or any aspect thereof may be implemented in the context of the architecture and functionality of the embodiments described herein. Also, the data aggregation approach 700 or any aspect thereof may be implemented in any desired environment.

As shown, the data aggregation approach commences by selecting a focus node (see operation 702), then retrieving data pertaining to the focus node and its child nodes (see operation 703) through to the lowest level of a hierarchy rooted at the focus node. The data aggregation approach determines a set of rollup variables, for example, from a template 131 or from data items (see operation 704). A set of rollup variables can be amassed by parsing a template corresponding to the focus node. Then, the flow traverses through the retrieved nodes while collecting a set of rollup values for the rollup variables (see operation 706). Having the set of rollup values for the rollup variables, an aggregation function can be applied (see operation 708). The particular aggregation function may observe levels of hierarchy when performing the aggregation function. For example, an aggregation function "Sum", might be defined as "calculate the sum of the values given in one level below", and the result or results of applying the aggregation function can be displayed (see operation 710). In some cases an aggregation function is applied top-down, and in other cases an aggregation function is applied bottom-up.

Described herein are novel approaches that allow a user of an enterprise system to visualize business data hierarchy relationships in a graphical format. The various embodiments use a flexible framework to allow a user to configure the data displayed in the visualization. The disclosure enables a better approach for users to access the hierarchical data, for example to facilitate making better business decisions.

Additional Embodiments of the Disclosure

Additional Practical Applications

Figure 8:
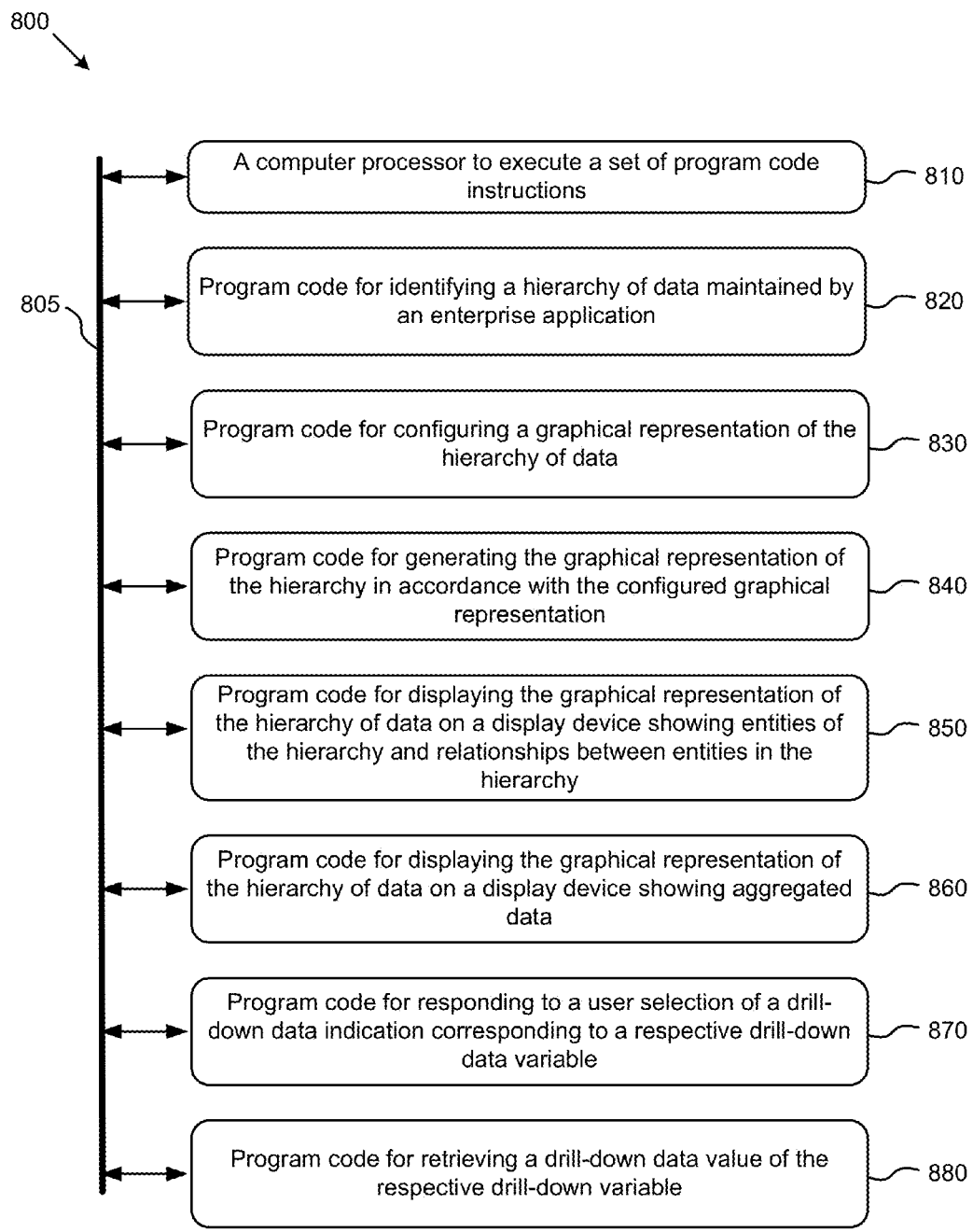
FIG. 8 is a block diagram of a system for automatic generation of hierarchical data for presentation in hierarchy visualizations, according to some embodiments.

FIG. 8 is a block diagram of a system for automatic generation of hierarchical data for presentation in hierarchy visualizations, according to some embodiments. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: identifying a hierarchy of data maintained by an enterprise application (see module 820); configuring a graphical representation of the hierarchy of data (see module 830); generating the graphical representation of the hierarchy in accordance with the configured graphical representation (see module 840); displaying the graphical representation of the hierarchy of data on a display device showing entities of the hierarchy and relationships between entities in the hierarchy (see module 850); displaying the graphical representation of the hierarchy of data on a display device showing aggregated data (see module 860); responding to a user selection of a drill-down data indication corresponding to a respective drill-down data variable (see module 870); and retrieving a drill-down data value of the respective drill-down variable (see module 880).

Figure 9:
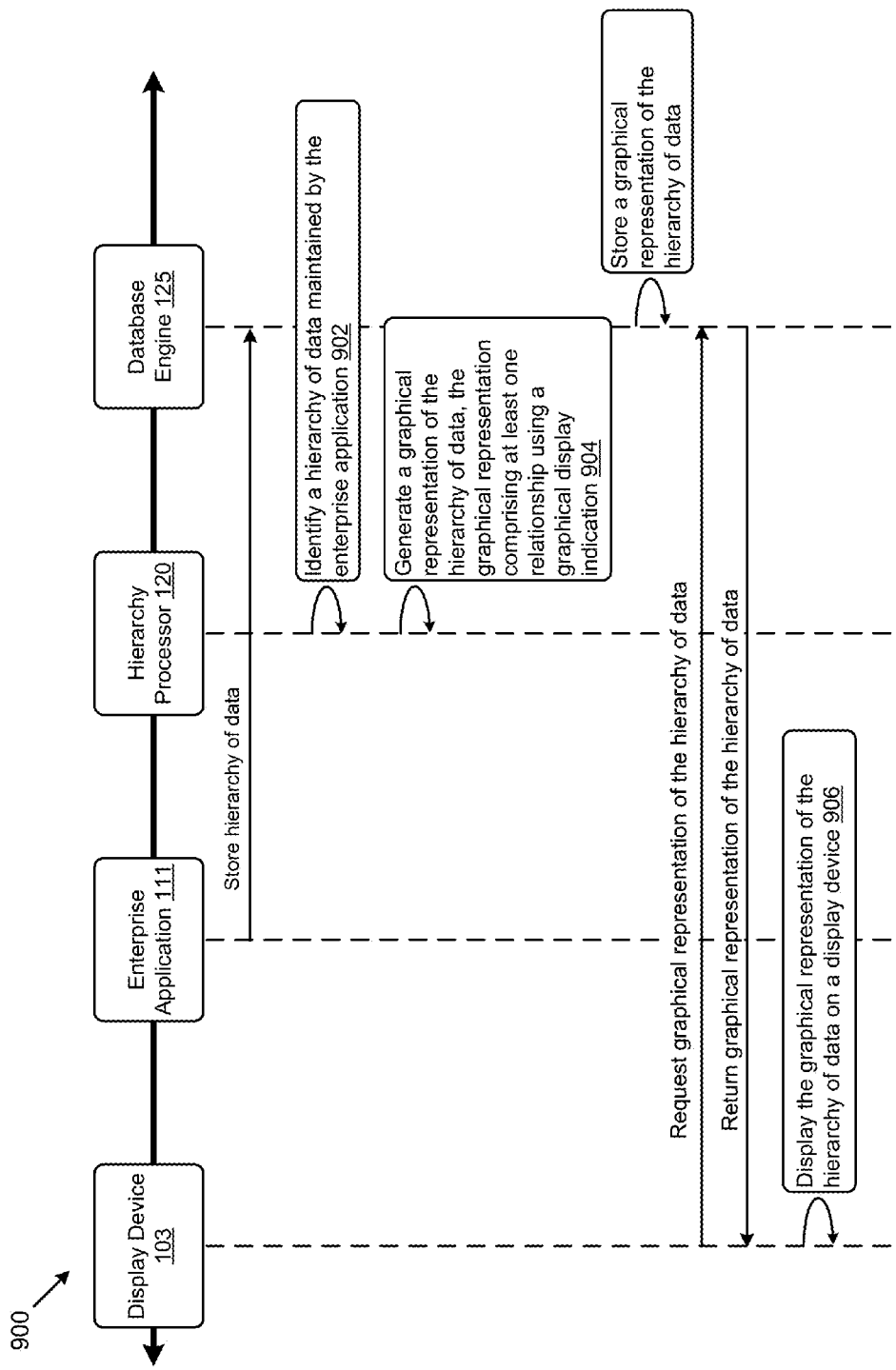
FIG. 9 is a block diagram of a system for automatic generation of hierarchical data for presentation in hierarchy visualizations, according to some embodiments.

FIG. 9 is a block diagram of a system 900 for automatic generation of hierarchical data for presentation in hierarchy visualizations, according to some embodiments.

As shown, the system comprises:
an enterprise application that accesses a database engine;
a hierarchy processor to identify a hierarchy of data maintained by the enterprise application (see operation 902);
a database engine configured to store a graphical representation of the hierarchy of data, the graphical representation comprising at least one relationship using a graphical display indication (see operation 904); and
a display device to display the graphical representation of the hierarchy of data on a display device (see operation 906).

System Architecture Overview

Additional Practical Applications

Figure 10:
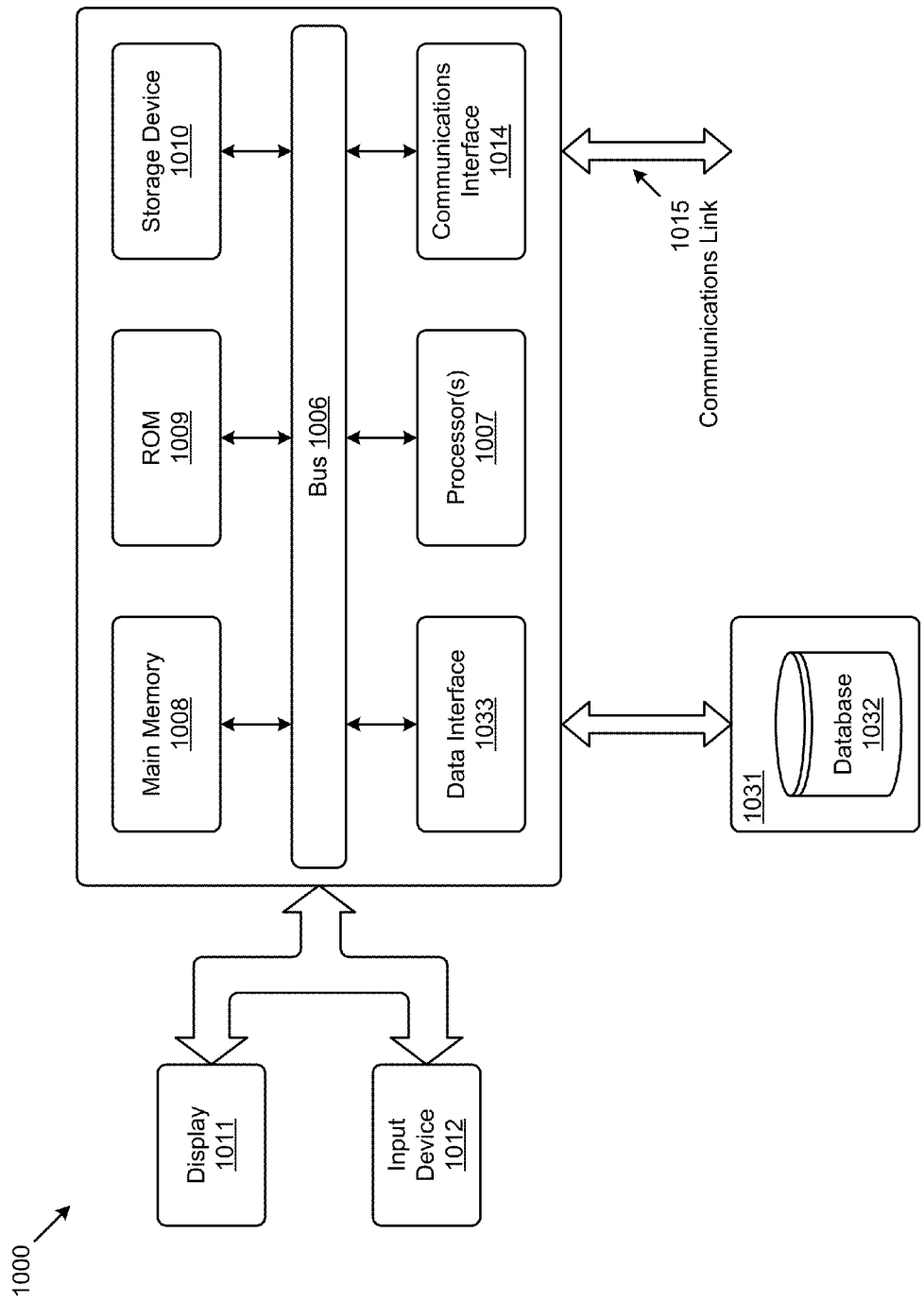
FIG. 10 depicts a block diagram of an instance of a computer system suitable for implementing an embodiment of the present disclosure.

FIG. 10 depicts a block diagram of an instance of a computer system 1000 suitable for implementing an embodiment of the present disclosure. Computer system 1000 includes a bus 1006 or other communication mechanism for communicating information, which interconnects subsystems and devices, such as a processor 1007, a system memory 1008 (e.g., RAM), a static storage device (e.g., ROM 1009), a disk drive 1010 (e.g., magnetic or optical), a data interface 1033, a communication interface 1014 (e.g., modem or Ethernet card), a display 1011 (e.g., CRT or LCD), input devices 1012 (e.g., keyboard, cursor control), and an external data repository 1031.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1000. According to certain embodiments of the disclosure, two or more computer systems 1000 coupled by a communications link 1015 (e.g., LAN, PTSN, or wireless network) may perform the sequence of instructions required to practice the disclosure in coordination with one another.

Computer system 1000 may transmit and receive messages, data, and instructions, including programs (e.g., application code), through communications link 1015 and communication interface 1014. Received program code may be executed by processor 1007 as it is received, and/or stored in disk drive 1010 or other non-volatile storage for later execution. Computer system 1000 may communicate through a data interface 1033 to a database 1032 on an external data repository 1031. A module as used herein can be implemented using any mix of any portions of the system memory 1008, and any extent of hard-wired circuitry including hard-wired circuitry embodied as a processor 1007.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for generating user selected hierarchies, the method comprising:
 facilitating a presentation of a data structure that:
  includes a plurality of nodes;
  identifies, for each node of the plurality of nodes, one or more relationships between the node and at least one other node of the plurality of nodes; and
  associates, for each node of the plurality of nodes, the node with each of one or more data values, each data value of the one or more data values being associated with a corresponding value type;
 receiving, from a user device and responsive to the presentation, a selection of:
  a focus node from amongst the plurality of nodes;
  a focus value type;
 traversing the data structure to detect for each node of the plurality of nodes a one or more node relationships;
 generating a node hierarchy from the one or more node relationships, wherein the node hierarchy includes:
  an incomplete subset of the plurality of nodes, the incomplete subset including the focus node and a set of lower level nodes;
  a set of connections, each connection of the set of connections connecting two nodes of the incomplete subset and corresponding to a relationship between the two nodes;
  level data that associates the focus node with a top level of the node hierarchy and that associates each of the set of lower level nodes with a lower level in the node hierarchy below the top level in the node hierarchy;
 identifying a focus-data value for the focus node to be a data value that is of the focus value type and that is of the one or more data values associated with the focus node;
 identifying, for each lower level node of the set of lower level nodes, a data value for the node that is of the focus value type and that is of the one or more data values associated with the node; and
 defining an aggregated-data value based on the data values identified for each of the lower level nodes in the set of lower level nodes;
 generating a graphical representation of the node hierarchy that includes representations of:
  the level data; and
  the set of connections, each connection of the set of connections connecting two nodes of the incomplete subset and corresponding to a relationship between the two nodes;
  the focus-data value; and
  the aggregated-data value; and
 sending the graphical representation to the user device.

2. The method of claim 1, wherein the aggregated-data value is calculated using an aggregation function.

3. The method of claim 2, wherein the aggregation function is calculated based on at least one of, a SUM function, a COUNT function, a MAX function, or a MIN function.

4. The method of claim 1, in which the graphical representation includes using an arrow for each connection of the set of connections.

5. The method of claim 1, in which the graphical representation comprises:
 selecting an entity for display;
 retrieving attributes for the entity; and
 using a template to configure the attributes of the graphical representation.

6. The method of claim 5, in which the attributes comprise at least aggregated data.

7. The method of claim 5, wherein the template is defined by:
 specifying, in a first interface, an attribute of the entity;
 specifying, in a second interface, an attribute field that includes the attributes as a data source, wherein the attribute field corresponds to a display field in the graphical representation; and providing, in a third interface, a template that configures a grouping of one or more attribute fields to define a layout for the graphical representation.

8. The method of claim 1, further comprising providing a framework to store parameters and configuration controls for graphical representation.

9. The method of claim 8, in which the framework implements configuration of the node hierarchy displayed with multiple levels of customization.

10. The method of claim 1, in which the presentation of the data structure provides information at multiple levels of the node hierarchy.

11. The method of claim 1, in which an interface rendering module is used to generate the graphical representation of the node hierarchy on the user device.

12. The method of claim 1, in which identifying the node hierarchy comprises:
storing the set of connections into a table structure having hierarchical information for the focus node and any lower level node of the set of lower level nodes from the focus node, wherein the table structure comprises:
(1) a first column storing an identifier for a node;
(2) a second column storing the identifier for a lower level node of the set of lower level nodes of the node identified in the first column; and
(3) a third column storing a data value for the node identified in the first column; and
generating the aggregated-data value for the node by identifying data contributions from the third column of the table structure for all lower level node of the set of lower level nodes corresponding to the node, where the lower level node of the set of lower level nodes are identified from the second column of the table structure.

13. The method of claim 1, in which identifying the node hierarchy comprises:
storing the set of connections into a table structure having hierarchical information for the focus node and any lower level node of the set of lower level nodes from the focus node, wherein the table structure comprises:
(1) a first column storing an identifier for a node;
(2) a second column storing the identifier for a lower level node of the set of lower level nodes of the node identified in the first column; and
(3) a third column storing a data value for the node identified in the first column; and
generating the aggregated-data value for the node by identifying a parent node for the node from the second column of the table structure, and calculating a rollup value for the node from the third column of the table structure.

14. A computer program product for generating user selected hierarchies embodied in a non-transitory computer readable medium, the non-transitory computer readable medium having stored thereon a sequence of instructions which, when executed by a processor causes the processor to execute a process, the process comprising:
facilitating a presentation of a data structure that:
includes a plurality of nodes;
identifies, for each node of the plurality of nodes, one or more relationships between the node and at least one other node of the plurality of nodes; and
associates, for each node of the plurality of nodes, the node with each of one or more data values, each data value of the one or more data values being associated with a corresponding value type;
receiving, from a user device and responsive to the presentation, a selection of:
a focus node from amongst the plurality of nodes;
a focus value type;
traversing the data structure to detect for each node of the plurality of nodes, a one or more node relationships;
generating a node hierarchy from the one or more node relationships, wherein the node hierarchy includes:
an incomplete subset of the plurality of nodes, the incomplete subset including the focus node and a set of lower level nodes;
a set of connections, each connection of the set of connections connecting two nodes of the incomplete subset and corresponding to a relationship between the two nodes;
level data that associates the focus node with a top level of the node hierarchy and that associates each of the set of lower level nodes with a lower level in the node hierarchy below the top level in the node hierarchy;
identifying a focus-data value for the focus node to be a data value that is of the focus value type and that is of the one or more data values associated with the focus node;
identifying, for each lower level node of the set of lower level nodes, a data value for the node that is of the focus value type and that is of the one or more data values associated with the node; and
defining an aggregated-data value based on the data values identified for each of the lower level nodes in the set of lower level nodes;
generating a graphical representation of the node hierarchy that includes representations of:
the level data; and
the set of connections, each connection of the set of connections connecting two nodes of the incomplete subset and corresponding to a relationship between the two nodes;
the focus-data value; and
the aggregated-data value; and
sending the graphical representation to the user device.

15. The computer program product of claim 14, wherein the aggregated-data value is calculated using an aggregation function.

16. The computer program product of claim 15, wherein the aggregation function is based on at least one of, a SUM function, a COUNT function, a MAX function, or a MIN function.

17. The computer program product of claim 14, in which the graphical representation includes using an arrow for each connection of the set of connections.

18. The computer program product of claim 14, in which the graphical representation comprises:
selecting an entity for display;
retrieving attributes for the entity; and
using a template to configure the attributes of the graphical representation.

19. The computer program product of claim 18, in which the attributes comprise at least aggregated data.

20. The computer program product of claim 18, wherein the template is defined by:
specifying, in a first interface, an attribute of the entity;
specifying, in a second interface, an attribute field that includes the attributes as a data source, wherein the attribute field corresponds to a display field in the presentation of the data structure; and providing, in a third interface, a template that configures a grouping of one or more attribute fields to define a layout for the graphical representation.

21. The computer program product of claim 14, further comprising instructions for providing a framework to store parameters and configuration controls for presentation of the data structure.

22. The computer program product of claim 21, in which the framework implements configuration of the node hierarchy displayed in the node hierarchy with multiple levels of customization.

23. The computer program product of claim 14, in which the presentation of the data structure provides information at multiple levels of the node hierarchy.

24. The computer program product of claim 14, in which an interface rendering module is used to generate the graphical representation of the node hierarchy on the user device.

25. The computer program product of claim 14, in which identifying the node hierarchy comprises:
   storing the set of connections into a table structure having hierarchical information for the focus node and any lower level node of the set of lower level nodes from the focus node, wherein the table structure comprises:
      (1) a first column storing an identifier for a node;
      (2) a second column storing the identifier for a lower level node of the set of lower level nodes of the node identified in the first column; and
      (3) a third column storing a data value for the node identified in the first column; and
   generating the aggregated-data value for the node by identifying data contributions from the third column of the table structure for all lower level node of the set of lower level nodes corresponding to the node, where the lower level node of the set of lower level nodes are identified from the second column of the table structure.

26. The computer program product of claim 14, in which identifying the node hierarchy comprises:
   storing the set of connections into a table structure having hierarchical information for the focus node and any lower level node of the set of lower level nodes from the focus node, wherein the table structure comprises:
      (1) a first column storing an identifier for a node;
      (2) a second column storing the identifier for a lower level node of the set of lower level nodes of the node identified in the first column; and
      (3) a third column storing a data value for the node identified in the first column; and
   generating the aggregated-data value for the node by identifying a parent node for the node from the second column of the table structure, and calculating a rollup value for the node from the third column of the table structure.

27. A computer system for generating user selected hierarchies, the computer system comprising:
   one or more processors performing actions of:
      facilitating a presentation of a data structure that:
         includes a plurality of nodes;
         identifies, for each node of the plurality of nodes one or more relationships between the node and at least one other node of the plurality of nodes; and
         associates, for each node of the plurality of nodes, the node with each of one or more data values, each data value of the one or more data values being associated with a corresponding value type;
      receiving, from a user device and responsive to the presentation, a selection of:
         a focus node from amongst the plurality of nodes;
         a focus value type;
      traversing the data structure to detect for each node of the plurality of nodes, one or more node relationships between the node and at least one other node of the plurality of nodes;
      generating a node hierarchy from one or more node relationships between the node and at least one other node of the plurality of nodes, wherein the node hierarchy includes:
         an incomplete subset of the plurality of nodes, the incomplete subset including the focus node and a set of lower level nodes;
         a set of connections, each connection of the set of connections connecting two nodes of the incomplete subset and corresponding to a relationship between the two nodes;
         level data that associates the focus node with a top level of the node hierarchy and that associates each of the set of lower level nodes with a lower level in the node hierarchy below the top level in the node hierarchy;
      identifying a focus-data value for the focus node to be a data value that is of the focus value type and that is of the one or more data values associated with the focus node;
      identifying, for each lower level node of the set of lower level nodes, a data value for the node that is of the focus value type and that is of the one or more data values associated with the node; and
      defining an aggregated-data value based on the data values identified for each of the lower level nodes in the set of lower level nodes;
      generating a graphical representation of the node hierarchy that includes representations of:
         the level data; and
         the set of connections, each connection of the set of connections connecting two nodes of the incomplete subset and corresponding to a relationship between the two nodes;
         the focus-data value; and
         the aggregated-data value; and
      sending the graphical representation to the user device.

28. The computer system of claim 27, wherein the aggregated-data value is calculated using an aggregation function.

29. The computer system of claim 27, in which an interface rendering module is used to generate the graphical representation on the user device.

30. The computer system of claim 28, wherein the aggregation function is based on at least one of, a SUM function, a COUNT function, a MAX function, or a MIN function.

31. The computer system of claim 27, in which the graphical representation includes using an arrow for each connection of the set of connections.

32. The computer system of claim 27, in which the graphical representation comprises:
   selecting an entity for display;
   retrieving attributes data for the entity; and
   using a template to configure the attributes data of the graphical representation.

33. The computer system of claim 32, in which the attributes data comprise at least aggregated data.

34. The computer system of claim 32, wherein the template is defined by:
specifying, in a first interface, an attribute of the entity;
specifying, in a second interface, an attribute field that includes the attributes as a data source, wherein the attribute field corresponds to a display field in the graphical representation; and
providing, in a third interface, a template that configures a grouping of one or more attribute fields to define a layout for the graphical representation.

35. The computer system of claim 27, further comprising:
a framework to store parameters and configuration controls for displaying the node hierarchy.

36. The computer system of claim 35, in which the framework implements configuration of the node hierarchy, displayed in the node hierarchy with multiple levels of customization.

37. The computer system of claim 27, in which a displayed node hierarchy provides information at multiple levels of the node hierarchy.

38. The computer system of claim 27, in which identifying the node hierarchy comprises:
storing the set of connections into a table structure having hierarchical information for the focus node and any lower level node of the set of lower level nodes from the focus node, wherein the table structure comprises:
(1) a first column storing an identifier for a node;
(2) a second column storing the identifier for a lower level node of the set of lower level nodes of the node identified in the first column; and
(3) a third column storing a data value for the node identified in the first column; and
generating the aggregated-data value for the node by identifying data contributions from the third column of the table structure for all lower level node of the set of lower level nodes child nodes corresponding to the node, where the lower level node of the set of lower level nodes child nodes are identified from the second column of the table structure.

39. The computer system of claim 27, in which identifying the node hierarchy comprises:
storing the set of connections into a table structure having hierarchical information for the focus node and any lower level node of the set of lower level nodes from the focus node, wherein the table structure comprises:
(1) a first column storing an identifier for a node;
(2) a second column storing the identifier for a lower level node of the set of lower level nodes of the node identified in the first column; and
(3) a third column storing a data value for the node identified in the first column; and
generating the aggregated-data value for the node by identifying a parent node for the node from the second column of the table structure, and calculating a rollup value for the node from the third column of the table structure.

* * * * *

UNITED STATES PATENT AND TRADEMARK OFFICE
CERTIFICATE OF CORRECTION

| | | |
|---|---|---|
| PATENT NO. | : 9,824,471 B2 | Page 1 of 1 |
| APPLICATION NO. | : 14/038640 | |
| DATED | : November 21, 2017 | |
| INVENTOR(S) | : Lei et al. | |

It is certified that error appears in the above-identified patent and that said Letters Patent is hereby corrected as shown below:

In the Specification

In Column 6, Line 28, after "131" insert -- . --.

In Column 9, Line 33, after "entity" insert -- . --.

In Column 13, Line 32, delete "PTSN," and insert -- PSTN, --, therefor.

In the Claims

In Column 20, Line 6, in Claim 38, after "level nodes" delete "child nodes".

In Column 20, Line 8, in Claim 38, after "level nodes" delete "child nodes".

Signed and Sealed this
Tenth Day of July, 2018

Andrei Iancu
*Director of the United States Patent and Trademark Office*